(12) United States Patent
Olar

(10) Patent No.: US 10,850,679 B2
(45) Date of Patent: Dec. 1, 2020

(54) ROLLUP TABLET COMPUTER HOLDER

(71) Applicant: Daniela Olar, Belleville, MI (US)

(72) Inventor: Daniela Olar, Belleville, MI (US)

( * ) Notice: Subject to any disclaimer, the term of this patent is extended or adjusted under 35 U.S.C. 154(b) by 0 days.

(21) Appl. No.: 16/009,232

(22) Filed: Jun. 15, 2018

(65) Prior Publication Data
US 2019/0381951 A1    Dec. 19, 2019

(51) Int. Cl.
*B60R 11/02* (2006.01)
*B60R 7/04* (2006.01)
*B60R 11/00* (2006.01)

(52) U.S. Cl.
CPC .......... *B60R 11/0252* (2013.01); *B60R 7/043* (2013.01); *B60R 2011/007* (2013.01); *B60R 2011/0017* (2013.01)

(58) Field of Classification Search
CPC .......... B60R 2011/007; B60R 11/0252; B60R 7/043; B60R 2011/0017; B60R 11/0235; B60R 2011/0015; B60R 2011/0012; B60R 11/0229; B60R 2011/0059; A63B 2210/50; A63B 2210/58; A47B 97/02; A63F 2007/3655; A63F 9/0402; A63F 7/36; A63F 2007/3648; A63F 2007/3614; G03B 21/58; B64D 11/0602; B64D 11/0605; B43L 1/123

USPC .................................................. 224/275, 600
See application file for complete search history.

(56) References Cited

U.S. PATENT DOCUMENTS

| | | | | |
|---|---|---|---|---|
| 5,984,347 A * | 11/1999 | Blanc-Rosset | ......... | B60N 3/004 224/275 |
| 7,350,325 B1 * | 4/2008 | Wang | ...................... | G09F 11/29 40/514 |
| D568,364 S * | 5/2008 | Jeoung | .......................... | D16/241 |
| 7,832,037 B2 * | 11/2010 | Overton | .................. | B60N 3/001 5/655 |
| 8,100,697 B2 * | 1/2012 | Budryk | ...................... | B43L 1/00 434/412 |
| 2010/0055661 A1 * | 3/2010 | Hegwood | .............. | A47B 97/02 434/420 |

* cited by examiner

*Primary Examiner* — Nathan J Newhouse
*Assistant Examiner* — Matthew T Theis
(74) *Attorney, Agent, or Firm* — The Iwashko Law Firm, PLLC; Lev Ivan Gabriel Iwashko

(57) ABSTRACT

A rollup tablet computer holder, including a roller case, a retractable board disposed within the roller case to be extracted from the roller case, a tray disposed at an end of the retractable board to hold a tablet computer thereupon, and a plurality of attachment hooks disposed at a top portion of the roller case to attach to rods of a head rest of a car seat.

3 Claims, 1 Drawing Sheet

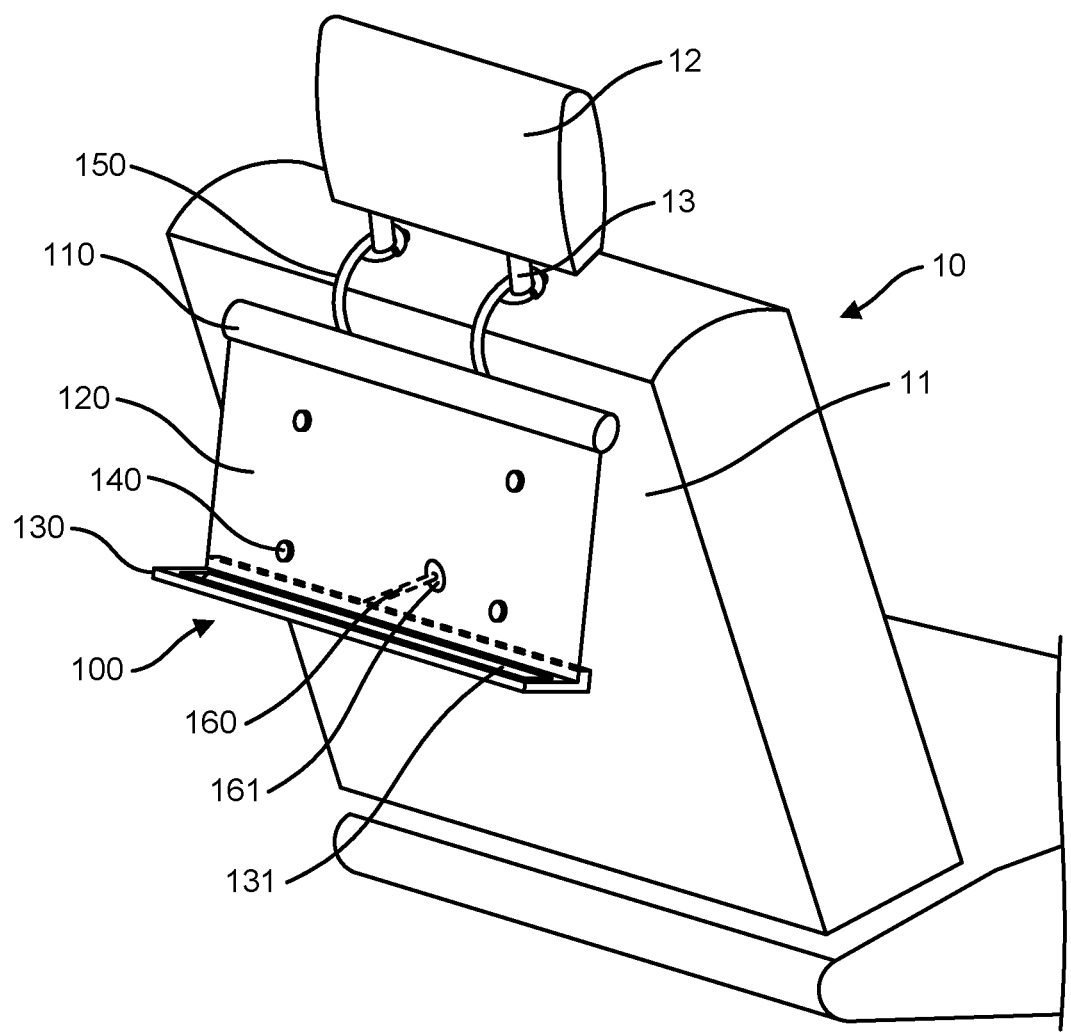

ROLLUP TABLET COMPUTER HOLDER

BACKGROUND

1. Field

The present general inventive concept relates generally to a tablet computer holder, and particularly, to a rollup tablet computer holder.

2. Description of the Related Art

Holding a smart device, such as a tablet computer, can be a hazardous task while driving, and can also become troublesome for passengers who get tired of holding their devices up. Currently, on the market, there are cell phone stands that clip onto air vents, but these stands do not accommodate larger smart devices, and are not designed for the convenience of back seat passengers.

Therefore, there is a need for a device that conveniently holds a tablet computer for back seat passengers of a vehicle.

SUMMARY

The present general inventive concept provides a rollup tablet computer holder.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a rollup tablet computer holder, including a roller case, a retractable board disposed within the roller case to be extracted from the roller case, a tray disposed at an end of the retractable board to hold a tablet computer thereupon, and a plurality of attachment hooks disposed at a top portion of the roller case to attach to rods of a head rest of a car seat.

The rollup tablet computer holder may further include a plurality of magnets disposed within the retractable board to magnetically hold the tablet computer on the retractable board.

The rollup tablet computer may further include a retractable support stick disposed within a back portion of the tray to allow the retractable board to contact a back portion of the car seat to allow the retractable board to sit in an upright position.

When the retractable board is extracted from the roller case, the retractable board may retract into the roller case when the retractable board is tugged in a downward direction.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a rollup tablet computer holder, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a rollup tablet computer holder 100, according to an exemplary embodiment of the present general inventive concept.

The rollup tablet computer holder 100 may include a roller case 110, a retractable board 120, a tray 130, a plurality of magnets 140, a plurality of attachment hooks 150, and a retractable support stick 160.

The rollup tablet computer holder 100, and components thereof, may be constructed from plastic, metal, wood, rubber, cloth, or any other material known to one of ordinary skill in the art.

The roller case 110 may have a cylindrical shape, but is not limited thereto.

The roller case 110 may house the retractable board 120 therein, and may have a spring mechanism (not illustrated) inside to allow the retractable board 120 to be extracted from within the roller case 110 and held outside the roller case 110. When the retractable board 120 is fully extracted from within the roller case 110, the retractable board 120 may be tugged again in a downward direction to allow the spring mechanism to retract the retractable board 120 back within the roller case 110.

The tray 130 may be disposed at an end of the retractable board 120 to allow a tablet computer to be disposed thereupon, so that a user may easily view images displayed on the tablet computer without having to hold it.

The plurality of magnets 140 may be provided in singular form or plural form in various positions within the retractable board 120, and may be included to allow the tablet computer to stick to the retractable board 120.

The plurality of attachment hooks 150 may be disposed at a top portion of the roller case 110, such that the roller case 110 may be detachably attached to rods 13 of a headrest 12 of a car seat 10.

The retractable support stick 160 may be disposed at a back portion of the retractable board 120, specifically, at a back portion of the tray 130. The retractable support stick 160 may be extracted from the back portion of the tray 130, to allow the retractable board 120 to sit in an upright position when the seat 10 is disposed at an angle. The retractable support stick 160 may also include a rounded end to securely sit against and contact a back portion 11 of the car seat 10.

A non-slip surface 131, such as a rubber surface, may be disposed on a top portion of the tray 130, to allow the tablet computer to "stick" thereto.

As such, the tablet computer, or any other device, may sit securely on the tray 130 while resting and "sticking" to the retractable board 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A rollup tablet computer holder, comprising:
   a roller case;
   a retractable board disposed within the roller case to be extracted from the roller case;
   a tray disposed at an end of the retractable board to hold a tablet computer thereupon, such that a first portion of the tray is disposed on at least a portion of a rear surface of the retractable board, and a second portion of the tray is angularly disposed with respect to the first portion away from a front surface of the retractable board, such that the second portion is planar, such that the retractable board is disposed on a top surface of the second portion;
   a retractable support stick disposed within a back portion of the tray to allow the retractable board to contact a back portion of a car seat to allow the retractable board to sit in an upright position, such that an end of the retractable support stick in contact with the back portion of the car seat is rounded, such that the second portion of the tray extends away from the retractable board in a lateral direction opposite with respect to the retractable support stick; and
   a plurality of attachment hooks disposed at a top portion of the roller case to attach to rods of a head rest of the car seat.

2. The rollup tablet computer holder of claim 1, further comprising:
   a plurality of magnets disposed within the retractable board to magnetically hold the tablet computer on the retractable board.

3. The rollup tablet computer holder of claim 1, wherein when the retractable board is extracted from the roller case, the retractable board retracts into the roller case when the retractable board is tugged in a downward direction.

* * * * *